United States Patent [19]

Benz et al.

[11] 3,839,316

[45] Oct. 1, 1974

[54] PHENYL-AZO-PYRAZOLONE DYES CONTAINING TWO SULFO GROUPS

[75] Inventors: Jakob Benz, Oberwil/Basel Land, Switzerland; Roland Mislin, Saint-Louis, France; Hanspeter Uehlinger, Basel, Switzerland

[73] Assignee: Sandoz Ltd., Basel, Switzerland

[22] Filed: Jan. 14, 1972

[21] Appl. No.: 217,946

[30] Foreign Application Priority Data
Jan. 20, 1971 Switzerland............................ 781/71
Jan. 22, 1971 Switzerland............................ 986/71

[52] U.S. Cl................... 260/162, 8/41 R, 8/41 A, 8/41 D, 260/163, 260/470
[51] Int. Cl............................................. C09b 29/38
[58] Field of Search............................ 260/162, 163

[56] References Cited
UNITED STATES PATENTS

| | | | |
|---|---|---|---|
| 1,758,385 | 5/1930 | Wagner et al. | 260/163 |
| 2,015,225 | 9/1935 | Kracker et al. | 260/163 |
| 2,773,055 | 12/1956 | Hindermann et al. | 260/163 |
| 3,139,420 | 6/1964 | Beffa et al. | 260/149 |
| 3,222,354 | 12/1965 | Lange | 260/163 |

FOREIGN PATENTS OR APPLICATIONS

| | | | |
|---|---|---|---|
| 341,586 | 11/1959 | Switzerland | 260/163 |
| 644,153 | 10/1928 | France | 260/162 |
| 1,175,666 | 12/1969 | Great Britain | 260/163 |

*Primary Examiner*—Lorraine A. Weinberger
*Assistant Examiner*—C. F. Warren
*Attorney, Agent, or Firm*—Gerald D. Sharkin; Richard E. Vila; Melvyn M. Kassenoff

[57] ABSTRACT

Dyestuffs of formula

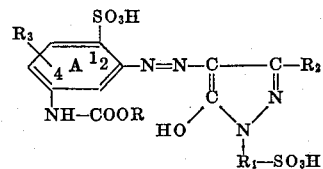

in which
R signifies a substituted or unsubstituted hydrocarbon radical,
$R_1$ signifies a substituted or unsubstituted phenylene or naphthylene radical,
$R_2$ signifies a substituted or unsubstituted alkyl or aryl radical,
$R_3$ signifies a hydrogen atom, a substituted or unsubstituted alkyl radical of one to six carbon atoms or a halogen atom, and
ring A may be further substituted,
useful for dyeing and printing polyamide, cellulosic and basic dyeable polypropylene fibres, leather and paper.

19 Claims, No Drawings

PHENYL-AZO-PYRAZOLONE DYES CONTAINING TWO SULFO GROUPS

The invention relates to azo dyes containing sulphonic acid groups.

According to the present invention, there are provided compounds of formula I,

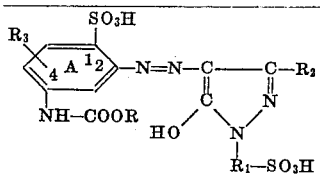
I in which
- R signifies a substituted or unsubstituted hydrocarbon radical,
- $R_1$ signifies a substituted or unsubstituted phenylene or naphthylene radical,
- $R_2$ signifies a substituted or unsubstituted alkyl or aryl radical,
- $R_3$ signifies a hydrogen atom, a substituted or unsubstituted alkyl radical of 1 to 6 carbon atoms or a halogen atom, and
- ring A may be further substituted.

Examples of hydrocarbon radicals include substituted or unsubstituted alkyl, cycloalkyl, alkylcycloalkyl or aryl radicals, e.g. cyclohexyl, alkylcyclohexyl, phenyl and naphthyl radicals.

As used herein, the term "alkyl" signifies a straight or branched chain alkyl radical of 1 to 18 carbon atoms, e.g. of 1 to 12 carbon atoms, particularly of 1 to 6 carbon atoms. Preferred alkyl radicals are from 1 to 4 carbon atoms except that, where R signifies an alkyl radical, such alkyl radical preferably contains 6 to 18 carbon atoms. The alkyl radicals may be substituted by, for example, halogen, hydroxy, cyano, alkoxy or aryl substituents. Suitable aryl substituted alkyl radicals include the benzyl radical. As used herein, the term "alkoxy" signifies an alkoxy radical containing from 1 to 6 carbon atoms, preferably from 1 to 4 carbon atoms.

As used herein, the term "cycloalkyl" signifies a cyclcalkyl radical of 5 to 7 carbon atoms.

Examples of aryl include phenyl and naphthyl radicals.

The aromatic rings, for example ring A and $R_1$, may be substituted, for example, by one or more halogen, cyano, nitro, hydroxy, trifluoroalkyl, trichloroalkyl, substituted or unsubstituted alkyl, cycloalkyl, aryl, alkoxy, carbalkoxy, acylamino, substituted, e.g. mono or disubstituted, or unsubstituted sulphonamido, substituted or unsubstituted alkylsulphonyl, arylsulphonyl, carboxylic acid ester or sulphonic acid ester, substituted or unsubstituted carboxylic acid amide or sulphonic acid groups.

By halogen is meant bromine, fluorine, iodine or chlorine, chlorine being preferred.

It is preferred that the compounds of formula I contain no metallizable group in the ortho-position to the —N=N-group in ring A.

The invention also provides a process for the production of a compound of formula I, stated above, characterised by (a) coupling a diazo derivative of an amine of formula II,

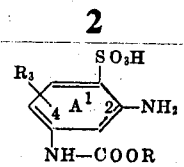
II in which R, $R_3$ and ring A are as defined above, with a compound of formula III,

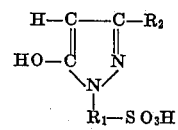
III in which $R_1$ and $R_2$ are as defined above, or (b) reacting a monoazo compound of formula IV,

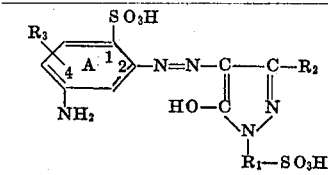
IV in which $R_1$, $R_2$, $R_3$ and ring A are as defined above, with a haloformic acid ester of formula V, $$R - O - CO - Hal$$
V in which Hal signifies a fluorine, chlorine, bromine or iodine atom, and R is as defined above.

Process (a) may be carried out in conventional manner for diazo coupling reactions, for example in an acid medium, e.g. at a pH value of from 2 to 6.

Process (b) may, similarily, be carried out in conventional manner, for example in water and in the presence of an acid binding agent and at a temperature from 40° to 150°C, especially 40° to 100°C, and preferably from 60° to 80°C.

Process (b) is the preferred process.

The resulting compounds of formula I may be isolated by conventional techniques.

The compounds of formula IV, used as starting materials in process (b), may be obtained by coupling a 2-diazo derivative of an amine of formula VI,

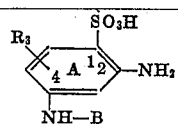
VI in which
- $R_3$ and ring A are as defined above, and B signifies a hydrogen atom or an acetyl group with a compound of formula III, stated above, and, where B signifies an acetyl group, deacetylating the resulting product.

The coupling reaction may be carried out in similar manner to process (a) described above. The deacetylation may be carried out in conventional manner.

The compounds of formulae II, III, IV, V and VI are known or may be obtained in known manner from available starting materials.

Particular compounds of formula I are the compounds of the following formulae Ia, Ib and Ic.

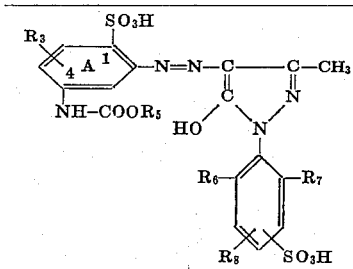

Ia in which
R₃ and ring A are as defined above,
R₅ signifies a substituted or unsubstituted alkyl, aryl or cycloalkyl radical, and
R₆, R₇ and R₈, which may be the same or different, each signifies a hydrogen or halogen atom or a substituted or unsubstituted alkyl or alkoxy radical,

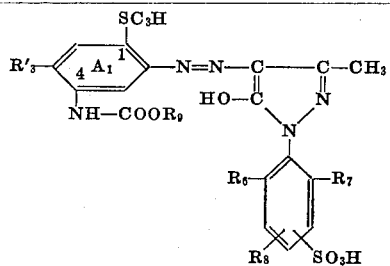

Ib in which
R₆, R₇ and R₈ are as defined above,
R₃' signifies a hydrogen or chlorine atom or a methyl radical,
R₉ signifies a substituted or unsubstituted alkyl radical of 6 to 18 carbon atoms or a substituted or unsubstituted cyclohexyl radical, and ring A₁ bears no further substituents,

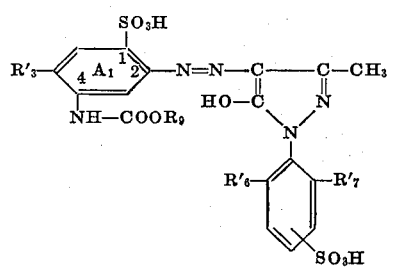

Ic in which
R₃', R₉ and ring A₁ are as defined above,
R₆' signifies a hydrogen or halogen atom or an alkyl radical of 1 to 6 carbon atoms, and
R₇' signifies a hydrogen or halogen atom, an alkyl radical of 1 to 6 carbon atoms or an alkoxy radical of 1 to 6 carbon atoms.

The compounds of formula I may suitably be used for dyeing and printing natural and synthetic polyamide fibres and other textile fibres. In particular, they may be used for exhaust dyeing, pad-dyeing and printing of natural and synthetic polyamide fibres, natural and regenerated cellulosic fibres and basic dyeable polypropylene fibres, which fibres may be dyed in loose, yarn, fabric or blended form. The compounds of formula I may also suitably be used for dyeing and printing paper and leather.

In exhaust dyeing, the compounds are conveniently applied from a neutral to acid bath at a pH value of 2 to 7, preferably from 4 to 5, in the presence of an acid, e.g. an organic acid such as acetic or formic acid. The dyeings have good light and wet fastness, e.g. fastness to washing, sea water, perspiration, acid, alkali, aldehyde, potting and milling, and good fastness to gas fumes. They are also fast to rubbing. The dyes are well soluble in water, show satisfactory levelling properties and cover barry nylon.

The compounds of the present invention can be applied alone, in combination with each other or with acid dyes, e.g. of the anthraquinone series, to give dyeings of comparably good light and wet fastness. If the compounds of formula I are used in combination with blue dyes, e.g. blue anionic anthraquinone dyes, the dyeings are free from catalytic fading.

For printing with the present dyes known methods can be employed, for instance that described in U.S. Pat. No. 3,594,112.

Natural polyamide fibres which may be dyed with the dyes of the invention include wool and silk. Synthetic polyamide fibres which may be dyed include those from polymers formed by condensation polymerization of ω-aminocarboxylic acids or their lactams, e.g. the fibres from ω-lauric lactam 11-undecano-carboxylic acid, 7-aminoenanthic acid or ε-caprolactam (polyamides 12, 11, 7 and 6), of dibasic organic acids, e.g. dicarboxylic acids 7 adipic, sebacis acid) and diamines (e.g. hexamethylene diamine) (polyamides 66 and 610), or by mixed condensation polymerization, e.g. of ε-caprolactam, adipic acid and hexamethylene diamine (polyamide 66/6).

In comparison with the known dyes, e.g those disclosed in Swiss Pat. No. 341,586, the compounds of formula I, have the advantage of being more suitable for application to natural and synthetic polyamide fibres by printing processes. In addition, they have noteworthy solubility in water.

The following Examples, in which the parts and percentages are by weight and the temperatures in degrees Centigrade, illustrate the invention.

EXAMPLE 1 i. Process (a)

20 parts of 2-amino-4-carbododecyloxyaminobenzene-1-sulphonic acid (which is obtainable by reaction of 2,4-diaminobenzene-1-sulphonic acid with lauryl chloroformate) are stirred into 300 parts of water at room temperature and 6.7 parts of 30 percent aqueous sodium hydroxide solution are added, 3.5 parts of sodium nitrite are added and stirring is continued until a solution is obtained. Over 30 minutes, the solution is dropwise added, with stirring, to 30 parts of concentrated hydrochloric acid and 150 parts of water at 0°–5°. The resulting suspension is stirred for 1 hour at 0°–5° and then added, dropwise, to a cooled solution consisting of 14.8 parts of 1-(2'-chloro-5'-sulpho)-phenyl-3-methyl-5-pyrazolone, 6.7 parts of a 30 percent aqueous sodium hydroxide solution and 100 parts of water, with care being taken to keep the temperature below 10°. While the diazo suspension is being added, the pH of the coupling mixture is held at 5 by the gradual addition of 10 percent aqueous soda solution. The coupling mixture is stirred for a further 3 hours. The dye formed settles out and is isolated by filtration, with suction, and is then dried. It is obtained as a yellow powder which, applied from a neutral to weakly acid bath, dyes wool and synthetic polyamide fibres in yellow shades, fast to light, washing and milling.

ii. Process (b)

26.5 Parts of the disodium salt form of the monoazo dye obtained by coupling diazotized-2-amino-4-acetylamino-benzene-1-sulphonic acid with 1-(2'-chloro-5'-sulpho)-phenyl-3-methyl-5-pyrazolone are dissolved in 300 parts of water and 300 parts of alcohol. Then, 25 parts of concentrated hydrochloric acid are added. The temperature of the solution is raised to 85° and stirred at this temperature for 3 hours. After it has cooled to room temperature, the precipitated deacetylated product is filtered, washed until neutral, and dissolved in 800 parts of water containing 5 parts of soda. The solution is heated to 50° and held at this temperature for 3 hours while 25 parts of lauryl chloroformate are dropwise added thereto. Throughout the reaction, the pH is maintained at 7.5 – 8 by the addition of aqueous soda solution. Subsequently, the solution is cooled, and the dye formed settles out. It is filtered with suction, washed with ice-water and dried. On natural and synthetic polyamide fibres, this dye gives bright greenish yellow dyeings having good light and wet fastness properties. 1, Id, The following table indicates further dyes of the invention which may be obtained in manner analogous to Example 1, and which are of formula Id,

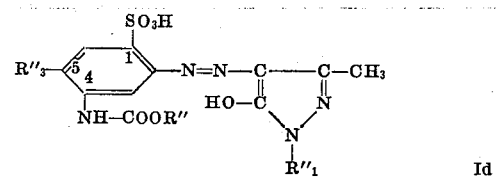

in which $R''$, $R_1''$ and $R_3''$ have the significances given in the table. The shade of the dyeings on synthetic polyamide fibre is noted in the final column.

Table

| Example No. | $R''$ | $R_1''$ | $R_3''$ | Shade of dyeing on synthetic polyamide fibre |
|---|---|---|---|---|
| 2 | Dodecyl | (2'-Chloro-6'-methyl-4'-sulpho)-phenyl | H | yellow |
| 3 | do. | (2',5'-Dichloro-4'-sulpho)-phenyl | H | do. |
| 4 | Decyl | do. | H | do. |
| 5 | Undecyl | do. | H | do. |
| 6 | Nonyl | do. | H | do. |
| 7 | Iso-octyl | do. | H | do. |
| 8 | Di-isobutyl | do. | H | do. |
| 9 | Heptyl | do. | H | do. |
| 10 | 2-Ethyl-hexyl | do. | H | do. |
| 11 | Cyclohexyl | do. | H | do. |
| 12 | p-Ethyl-cyclohexyl | do. | H | do. |
| 13 | 3',4',5'-Trimethylcyclohexyl | do. | H | do. |
| 14 | p-Tert-butyl-cyclohexyl | do. | H | do. |
| 15 | Benzyl | do. | H | do. |
| 16 | Ethylphenyl | do. | H | do. |
| 17 | Tridecyl | do. | H | do. |
| 18 | n-Tetradecyl | do. | H | do. |

Table—Continued

| Example No. | R'' | $R_1''$ | $R_3''$ | Shade of dyeing on synthetic polyamide fibre |
|---|---|---|---|---|
| 19 | n-Pentadecyl | (2',5'-Dichloro-4'-sulpho)-phenyl | H | yellow |
| 20 | n-Hexadecyl | do. | H | do. |
| 21 | n-Heptadecyl | do. | H | do. |
| 22 | Decyl | (2'-Chloro-5'-sulpho)-phenyl | H | do. |
| 23 | Undecyl | do. | H | do. |
| 24 | Nonyl | do. | H | do. |
| 25 | Iso-octyl | do. | H | do. |
| 26 | Di-isobutyl | do. | H | do. |
| 27 | Heptyl | do. | H | do. |
| 28 | 2-Ethyl-hexyl | do. | H | do. |
| 29 | Cyclohexyl | do. | H | do. |
| 30 | p-Ethyl-cyclohexyl | do. | H | do. |
| 31 | 3',3',5'-Trimethylcyclohexyl | do. | H | do. |
| 32 | p-Tert-butyl-cyclohexyl | do. | H | do. |
| 33 | Benzyl | do. | H | do. |
| 34 | Ethylphenyl | do. | H | do. |
| 35 | Tridecyl | do. | H | do. |
| 36 | n-Tetradecyl | do. | H | do. |
| 37 | n-Pentadecyl | do. | H | do. |
| 38 | n-Hexadecyl | do. | H | do. |
| 39 | n-Heptadecyl | do. | H | do. |
| 40 | Decyl | (2'-Chloro-6'-methyl-4'-sulpho)-phenyl | H | do. |
| 41 | Undecyl | do. | H | do. |
| 42 | Nonyl | do. | H | do. |
| 43 | Iso-octyl | do. | H | do. |
| 44 | Di-isobutyl | do. | H | do. |
| 45 | Heptyl | do. | H | do. |
| 46 | 2-Ethyl-hexyl | do. | H | do. |
| 47 | Cyclohexyl | do. | H | do. |
| 48 | p-Ethyl-cyclohexyl | do. | H | do. |
| 49 | 3',3',5'-Trimethylcyclohexyl | do. | H | do. |
| 50 | p-Tert-butyl-cyclohexyl | do. | H | do. |
| 51 | Benzyl | do. | H | do. |
| 52 | Ethylphenyl | do. | H | do. |
| 53 | Tridecyl | do. | H | do. |
| 54 | n-Tetradecyl | do. | H | do. |
| 55 | n-Pentadecyl | do. | H | do. |
| 56 | n-Hexadecyl | do. | H | do. |
| 57 | n-Heptadecyl | do. | H | do. |
| 58 | Dodecyl | (1'-Sulpho)-2'-naphthyl | H | do. |
| 59 | Decyl | do. | H | do. |
| 60 | Undecyl | do. | H | do. |
| 61 | Nonyl | do. | H | do. |
| 62 | Iso-octyl | do. | H | do. |
| 63 | Di-isobutyl | do. | H | do. |
| 64 | Heptyl | do. | H | do. |
| 65 | 2-Ethyl-hexyl | do. | H | do. |
| 66 | Cyclohexyl | do. | H | do. |
| 67 | p-Ethyl-cyclohexyl | do. | H | do. |
| 68 | 3',3',5'-Trimethylcyclohexyl | do. | H | do. |
| 69 | p-Tert-butyl cyclohexyl | do. | H | do. |
| 70 | Benzyl | do. | H | do. |
| 71 | Ethylphenyl | do. | H | do. |
| 72 | Tridecyl | do. | H | do. |
| 73 | n-Tetradecyl | do. | H | do. |
| 74 | n-Pentadecyl | do. | H | do. |
| 75 | n-Hexadecyl | do. | H | do. |
| 76 | n-Heptadecyl | do. | H | do. |
| 77 | Dodecyl | (2',5'-Di-chloro-4'-sulpho)-phenyl | —$CH_3$ | do. |
| 78 | Decyl | do. | do. | do. |
| 79 | Undecyl | do. | do. | do. |
| 80 | Nonyl | do. | do. | do. |
| 81 | Iso-octyl | do. | do. | do. |

Table—Continued

| Example No. | R'' | R₁'' | R₃'' | Shade of dyeing on synthetic polyamide fibre |
|---|---|---|---|---|
| 82 | Di-isobutyl | (2',5'-Dichloro-4'-sulpho)-phenyl | —CH₃ | yellow |
| 83 | Heptyl | do. | do. | do. |
| 84 | 2-Ethyl-Hexyl | do. | do. | do. |
| 85 | Cyclohexyl | do. | do. | do. |
| 86 | p-Ethyl-cyclohexyl | do. | do. | do. |
| 87 | 3',3',5'Tri methylcyclohexyl | do. | do. | do. |
| 88 | p-Tert-butyl-cyclohexyl | do. | do. | do. |
| 89 | Benzyl | do. | do. | do. |
| 90 | Ethylphenyl | do. | do. | do. |
| 91 | Tridecyl | do. | do. | do. |
| 92 | n-Tetradecyl | do. | do. | do. |
| 93 | n-Pentadecyl | do. | do. | do. |
| 94 | n-Hexadecyl | do. | do. | do. |
| 95 | n-Heptadecyl | do. | do. | do. |
| 96 | Dodecyl | (2'-Chloro-5'-sulpho)phenyl | do. | do. |
| 97 | Decyl | do. | do. | do. |
| 98 | Undecyl | do. | do. | do. |
| 99 | Nonyl | do. | do. | do. |
| 100 | Iso-octyl | do. | do. | do. |
| 101 | Di-isobutyl | do. | do. | do. |
| 102 | Heptyl | do. | do. | do. |
| 103 | 2-Ethyl-hexyl | do. | do. | do. |
| 104 | Cyclohexyl | do. | do. | do. |
| 105 | p-Ethyl-cyclohexyl | do. | do. | do. |
| 106 | 3',3',5'-Tri-methylcyclohexyl | do. | do. | do. |
| 107 | p-Tert-butyl cyclohexyl | do. | do. | do. |
| 108 | Benzyl | do. | do. | do. |
| 109 | Ethylphenyl | do. | do. | do. |
| 110 | Tridecyl | do. | do. | do. |
| 111 | n-Tetradecyl | do. | do. | do. |
| 112 | n-Pentadecyl | do. | do. | do. |
| 113 | n-Hexadecyl | do. | do. | do. |
| 114 | n-Heptadecyl | do. | do. | do. |
| 115 | Dodecyl | 2'-Chloro-6'-methyl-4'-sulpho)-phenyl | do. | do. |
| 116 | Decyl | do. | do. | do. |
| 117 | Undecyl | do. | do. | do. |
| 118 | Nonyl | do. | do. | do. |
| 119 | Iso-octyl | do. | do. | do. |
| 120 | Di-isobutyl | do. | do. | do. |
| 121 | Heptyl | do. | do. | do. |
| 122 | 2-Ethyl-hexyl | do. | do. | do. |
| 123 | Cyclohexyl | do. | do. | do. |
| 124 | p-Ethyl-cyclohexyl | do. | do. | do. |
| 125 | 3',3',3',5'-Tri-methylcyclohexyl | do. | do. | do. |
| 126 | p-Tertbutyl-cyclohexyl | do. | do. | do. |
| 127 | Benzyl | do. | do. | do. |
| 128 | Ethylphenyl | do. | do. | do. |
| 129 | Tridecyl | do. | do. | do. |
| 130 | n-Tetradecyl | do. | do. | do. |
| 131 | n-Pentadecyl | do. | do. | do. |
| 132 | n-Hexadecyl | do. | do. | do. |
| 133 | n-Heptadecyl | do. | do. | do. |
| 134 | Dodecyl | (1'-Sulpho)-2'-naphthyl | do. | do. |
| 135 | Decyl | do. | do. | do. |
| 136 | Undecyl | do. | do. | do. |
| 137 | Nonyl | do. | do. | do. |
| 138 | Iso-octyl | do. | do. | do. |
| 139 | Di-isobutyl | do. | do. | do. |
| 140 | Heptyl | do. | do. | do. |
| 141 | 2-Ethyl-hexyl | do. | do. | do. |
| 142 | Cyclohexyl | do. | do. | do. |
| 143 | p-Ethyl-cyclohexyl | do. | do. | do. |
| 144 | 3',3',5'-Tri-methylcyclohexyl | do. | do. | do. |
| 145 | p-Tert-butyl-cyclohexyl | do. | do. | do. |
| 146 | Benzyl | do. | do. | do. |
| 147 | Ethylphenyl | do. | do. | do. |

Table—Continued

| Example No. | R'' | $R_1''$ | $R_3''$ | Shade of dyeing on synthetic polyamide fibre |
|---|---|---|---|---|
| 148 | Tridecyl | (1'-Sulpho)-2'-naphthyl | —CH₃ | yellow |
| 149 | n-Tetradecyl | do. | do. | do. |
| 150 | n-Pentadecyl | do. | do. | do. |
| 151 | n-Hexadecyl | do. | do. | do. |
| 152 | n-Heptadecyl | do. | do. | do. |
| 153 | Dodecyl | (2',5'-Dichloro-4'-sulpho)-phenyl | —Cl | do. |
| 154 | Decyl | do | do. | do. |
| 155 | Undecyl | do. | do. | do. |
| 156 | Nonyl | do. | do. | do. |
| 157 | Iso-octyl | do. | do. | do. |
| 158 | Di-isobutyl | do. | do. | do. |
| 159 | Heptyl | do. | do. | do. |
| 160 | 2-Ethyl-hexyl | do. | do. | do. |
| 161 | Cyclohexyl | do. | do. | do. |
| 162 | p-Ethyl-cyclohexyl | do. | do. | do. |
| 163 | 3',3',5'-Trimethylcyclohexyl | do. | do. | do. |
| 164 | p-Tert-butyl-cyclohexyl | do. | do. | do. |
| 165 | Benzyl | do. | do. | do. |
| 166 | Ethylphenyl | do. | do. | do |
| 167 | Tridecyl | do. | do. | do. |
| 168 | n-Tetradecyl | do. | do. | do. |
| 169 | n-Pentadecyl | do. | do. | do. |
| 170 | n-Hexadecyl | do. | do. | do. |
| 171 | n-Heptadecyl | do. | do. | do. |
| 172 | Dodecyl | (2'Chloro-5'-sulpho)-phenyl | do. | do. |
| 173 | Decyl | do. | do. | do. |
| 174 | Undecyl | do. | do. | do. |
| 175 | Nonyl | do. | do. | do. |
| 176 | Iso-octyl | do. | do. | do. |
| 177 | Di-isobutyl | do. | do. | do. |
| 178 | Heptyl | do. | do. | do. |
| 179 | 2-Ethyl-hexyl | do. | do. | do. |
| 180 | Cyclohexyl | do. | do. | do. |
| 181 | p-Ethyl-cyclohexyl | do. | do. | do. |
| 182 | 3',3',5-trimethylcyclohexyl | do. | do. | do. |
| 183 | p-Tert-butyl-cyclohexyl | do. | do. | do. |
| 184 | Benzyl | do. | do. | do. |
| 185 | Ethylphenyl | do. | do. | do. |
| 186 | Tridecyl | do. | do. | do. |
| 187 | n-Tetradecyl | do. | do. | do. |
| 188 | n-Pentadecyl | do. | do. | do. |
| 189 | n-Hexadecyl | do. | do. | do. |
| 190 | n-Heptacecyl | do. | do. | do. |
| 191 | Dodecyl | (2'-Chloro-6'-methyl-4'-sulpho)-phenyl | do. | do. |
| 192 | Decyl | do. | do. | do. |
| 193 | Undecyl | do. | do. | do. |
| 194 | Nonyl | do. | do. | do. |
| 195 | Iso-octyl | do. | do. | do. |
| 196 | Di-isobutyl | do. | do. | do. |
| 197 | Heptyl | do. | do. | do. |
| 198 | 2-Ethyl-hexyl | do. | do. | do. |
| 199 | Cyclohexyl | do. | do. | do. |
| 200 | p-Ethyl-cyclohexyl | do. | do. | do. |
| 201 | 3',3',5'-Trimethylcyclohexyl | do. | do. | do. |
| 202 | -Tert-butyl-cyclohexyl | do. | do. | do. |
| 203 | Benzyl | do. | do. | do. |
| 204 | Ethylphenyl | do. | do. | do. |
| 205 | Tridecyl | do. | do. | do. |
| 206 | n-tetradecyl | do. | do. | do. |
| 207 | n-Pentadecyl | do. | do. | do. |
| 208 | n-Hexadecyl | do. | do. | do. |
| 209 | n-Heptadecyl | do. | do. | do. |
| 210 | Dodecyl | (1'-Sulpho)-2'-naphthyl | do. | do. |
| 211 | Decyl | do. | do. | do. |
| 212 | Undecyl | do. | do. | do. |
| 213 | Nonyl | do. | do. | do. |
| 214 | Iso-octyl | do. | do. | do. |
| 215 | Do-isobutyl | do. | do. | do. |
| 216 | Heptyl | do. | do. | do. |

Table — Continued

| Example No. | R'' | R₁'' | R₃'' | Shade of dyeing on synthetic polyamide fibre |
|---|---|---|---|---|
| 217 | 2-Ethyl-hexyl | (1'-Sulpho)-2'-naphthyl | —Cl | yellow |
| 218 | Cyclohexyl | do. | do. | do. |
| 219 | p-Ethyl-cyclohexyl | do. | do. | do. |
| 220 | 3',3',5'-Trimethylcyclohexyl | do. | do. | do. |
| 221 | p-Tert-butyl-cyclohexyl | do. | do. | do. |
| 222 | Benzyl | do. | do. | do. |
| 223 | Ethylphenyl | do. | do. | do. |
| 224 | Tridecyl | do. | do. | do. |
| 225 | n-Tetradecyl | do. | do. | do. |
| 226 | n-Pentadecyl | do. | do. | do. |
| 227 | n-Hexadecyl | do. | do. | do. |
| 228 | n-Heptadecyl | do. | do. | do. |
| 229 | Dodecyl | 4'-Sulpho-phenyl | H | do. |
| 230 | Decyl | do. | do. | do. |
| 231 | do. | 3'-Sulpho-phenyl | do. | do. |
| 232 | Dodecyl | do. | Cl | do. |
| 233 | do. | do. | —CH₃ | do. |
| 234 | do. | do. | C₂H₅ | do. |
| 235 | do. | do. | C₄H₉ | do. |
| 236 | do. | 2'-methoxy-5'-sulphophenyl | H | do. |
| 237 | do. | 2',6'-Di-methyl-4'-sulphophenyl | H | do. |
| 238 | do. | 2'-Sulpho-phenyl | H | do. |

The formulae of representative dyes of the foregoing Examples are as follows:

EXAMPLE 1

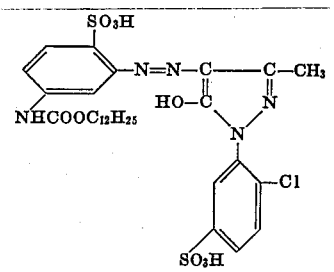

EXAMPLE 2

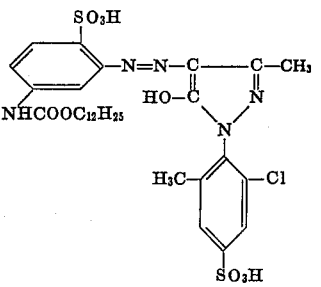

EXAMPLE 3

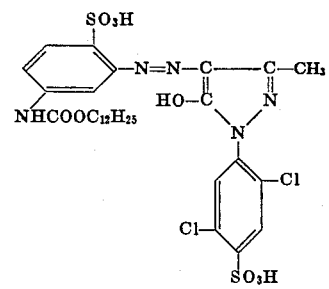

EXAMPLE 13

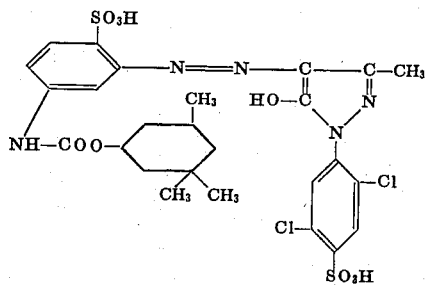

EXAMPLE 14

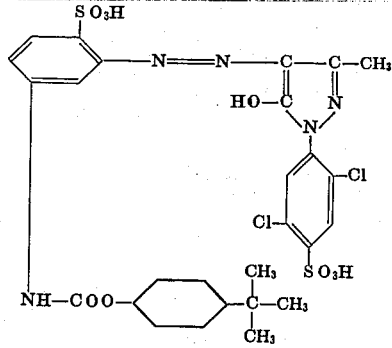

EXAMPLE 49

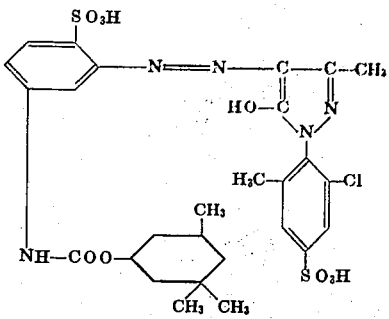

EXAMPLE 4

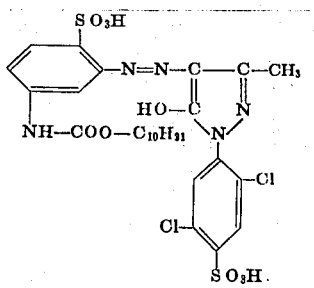

EXAMPLES OF APPLICATION

Exhaust Dyeing 100 parts of wool fabric are wet out and entered into a dyebath at 40° consisting of 4,000 parts of water, 10 parts of anhydrous sodium sulphate and 2 parts of the dye of Example 1. The dyebath is raised to the boil in 30 minutes and held at the boil for 1 hour. 4 parts of glacial acetic acid are then added and dyeing is continued for a further 30 minutes at the boil. During dyeing, the water lost by evaporation is continuously replaced. On removal from the bath, the fabric is rinsed with water and dried. It is dyed a greenish yellow shade.

This method is suitable for dyeing synthetic polyamide fibres with the disclosed dyes, on which they show good light and wet fastness. It is also employable for dyeing polypropylene fibres modified by the introduction of basic groups, the dyeings on these fibres being of similarly good quality.

Printing

A printing paste is prepared with:

```
  30 parts of the dye of Example 3,
  50 parts of thiodiethylene glycol
 500 parts of a 30% aqueous crystal gum solution
  60 parts of thiourea
  60 parts of a 20% aqueous ammonium sulphate solution and
 300 parts of water
1000 parts
```

The paste is printed on a nylon fabric by one of the standard methods, the fabric dried and the print fixed for 30–45 minutes at 102°. The fabric is then soaped at 60°, washed off and dried. A yellow print with good fastness properties is obtained. An equally good print is obtained when intermediate drying is omitted. On wool and other natural polyamide fibres, prints with similar good properties are obtained by this method.

What is claimed is:

1. A compound of the formula

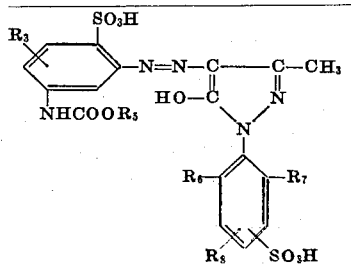

wherein
$R_3$ is hydrogen, halo, alkyl of 1 to 6 carbon atoms or alkyl of 1 to 6 carbon atoms substituted by halo, hydroxy, cyano, alkoxy of 1 to 6 carbon atoms, phenyl or naphthyl, $R_5$ is alkyl of 6 to 18 carbon atoms, cycloalkyl of 5 to 7 carbon atoms, cycloalkyl of 5 to 7 carbon atoms substituted by 1 to 3 alkyl groups of 1 to 6 carbon atoms or alkyl of 6 to 18 carbon atoms substituted by halo, hydroxy, cyano, alkoxy of 1 to 6 carbon atoms, phenyl or naphthyl, and each of $R_6$, $R_7$ and $R_8$ is independently hydrogen, halo, alkyl of 1 to 6 carbon atoms, alkoxy of 1 to 6 carbon atoms or alkyl of 1 to 6 carbon atoms substituted by halo, hydroxy, cyano, alkoxy of 1 to 6 carbon atoms, phenyl or naphthyl, wherein each halo is independently fluoro, chloro, bromo or iodo. chloro, 2. A compound according to claim 1 wherein
$R_3$ is hydrogen, halo, alkyl of 1 to 6 carbon atoms or alkyl of 1 to 6 carbon atoms substituted by halo, hydroxy, cyano, alkoxy of 1 to 6 carbon atoms or phenyl, $R_5$ is alkyl of 6 to 18 carbon atoms, cycloalkyl of 5 to 7 carbon atoms, cycloalkyl of 5 to 7 carbon atoms substituted by 1 to 3 alkyl groups of 1 to 6 carbon atoms or alkyl of 6 to 18 carbon atoms substituted by halo, hydroxy, cyano, alkoxy of 1 to 6 carbon atoms or phenyl, and each of $R_6$, $R_7$ and $R_8$ is independently hydrogen, halo, alkyl of 1 to 6 carbon atoms, alkoxy of 1 to 6 carbon atoms or alkyl of 1 to 6 carbon atoms substituted by halo, hydroxy, cyano, alkoxy of 1 to 6 carbon atoms or phenyl.

3. A compound according to claim 2 wherein
$R_3$ is hydrogen, halo or alkyl of 1 to 6 carbon atoms, $R_5$ is alkyl of 6 to 18 carbon atoms, cycloalkyl of 5 to 7 carbon atoms or cycloalkyl of 5 to 7 carbon atoms substituted by 1 to 3 alkyl groups of 1 to 6 carbon atoms, and each of $R_6$, $R_7$ and $R_8$ is independently hydrogen, halo, alkyl of 1 to 6 carbon atoms or alkoxy of 1 to 6 carbon atoms.

4. A compound according to claim 3 wherein each halo is chloro.

5. A compound according to claim 3 having the formula

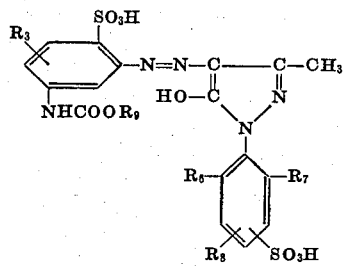

wherein
$R_3$ is hydrogen, halo or alkyl of 1 to 6 carbon atoms, each of $R_6$, $R_7$ and $R_8$ is independently hydrogen, halo, alkyl of 1 to 6 carbon atoms or alkoxy of 1 to 6 carbon atoms, and $R_9$ is alkyl of 6 to 18 carbon atoms, cyclohexyl or cyclohexyl substituted by 1 to 3 alkyl groups of 1 to 6 carbon atoms.

6. A compound according to claim 5 having the formula

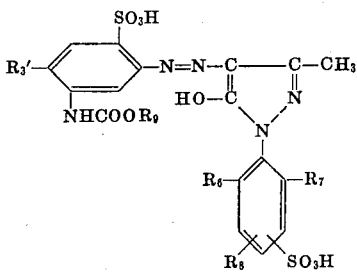

wherein
 $R_3'$ is hydrogen, chloro or methyl,
 each of $R_6$, $R_7$ and $R_8$ is independently hydrogen, halo, alkyl of 1 to 6 carbon atoms or alkoxy of 1 to 6 carbon atoms, and
 $R_9$ is alkyl of 6 to 18 carbon atoms, cyclohexyl or cyclohexyl substituted by 1 to 3 alkyl groups of 1 to 6 carbon atoms.

7. A compound according to claim 1 having the formula

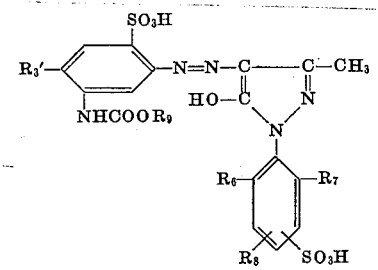

wherein
 $R_3'$ is hydrogen, chloro or methyl,
 each of $R_6$, $R_7$ and $R_8$ is independently hydrogen, halo, alkyl of 1 to 6 carbon atoms, alkoxy of 1 to 6 carbon atoms or alkyl of 1 to 6 carbon atoms substituted by halo, hydroxy, cyano, alkoxy of 1 to 6 carbon atoms, phenyl or naphthyl, and
 $R_9$ is alkyl of 6 to 18 carbon atoms, cyclohexyl, cyclohexyl substituted by 1 to 3 alkyl groups of 1 to 6 carbon atoms or alkyl of 6 to 18 carbon atoms substituted by halo, hydroxy, cyano, alkoxy of 1 to 6 carbon atoms, phenyl or naphthyl.

8. A compound according to claim 7 having the formula

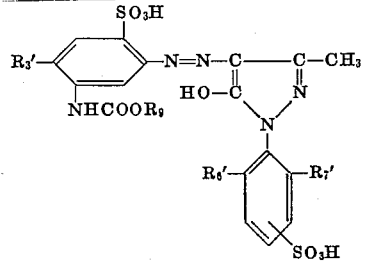

wherein
 $R_3'$ is hydrogen, chloro or methyl,
 $R_6'$ is hydrogen, halo or alkyl of 1 to 6 carbon atoms,
 $R_7'$ is hydrogen, halo, alkyl of 1 to 6 carbon atoms or alkoxy of 1 to 6 carbon atoms, and
 $R_9$ is alkyl of 6 to 18 carbon atoms, cyclohexyl, cyclohexyl substituted by 1 to 3 alkyl groups of 1 to 6 carbon atoms or alkyl of 6 to 18 carbon atoms substituted by halo, hydroxy, cyano, alkoxy of 1 to 6 carbon atoms, phenyl or naphthyl.

9. A compound according to claim 8 wherein
 $R_9$ is alkyl of 6 to 18 carbon atoms, cyclohexyl or cyclohexyl substituted by 1 to 3 alkyl groups of 1 to 6 carbon atoms.

10. A compound according to claim 9 wherein
 $R_9$ is alkyl of 6 to 18 carbon atoms, cyclohexyl, p-ethylcyclohexyl, p-tert-butylcyclohexyl or 3,3,5-trimethylcyclohexyl.

11. A compound according to claim 1 having the formula

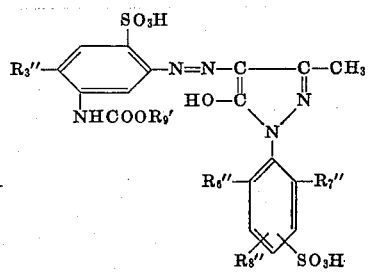

wherein
 $R_3''$ is hydrogen, chloro or alkyl of 1 to 4 carbon atoms,
 each of $R_6''$, $R_7''$ and $R_8''$ is independently hydrogen, chloro, methyl or methoxy, and
 $R_9'$ is alkyl of 7 to 17 carbon atoms, cyclohexyl, p-ethylcyclohexyl, p-tert-butylcyclohexyl or 3,3,5-trimethylcyclohexyl.

12. A compound according to claim 11 having the formula

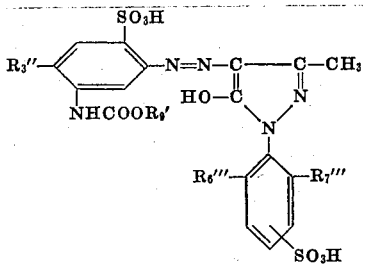

wherein
 $R_3''$ is hydrogen, chloro or alkyl or 1 to 4 carbon atoms, $R_6'''$ is hydrogen, chloro or methyl,
 $R_7'''$ is hydrogen, chloro, methyl or methoxy, and
 $R_9'$ is alkyl of 7 to 17 carbon atoms, cyclohexyl, p-ethylcyclohexyl, p-tert-butylcyclohexyl or 3,3,5-trimethylcyclohexyl.

13. A compound according to claim 11 having the formula

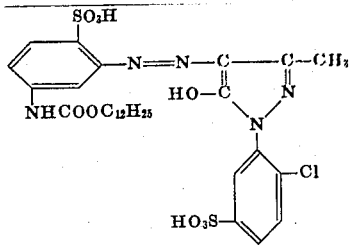

14. A compound according to claim 11 having the formula

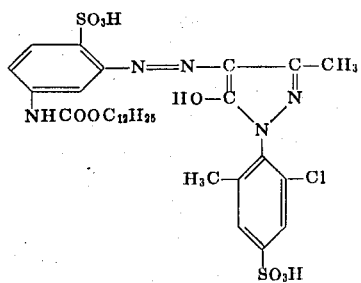
15. A compound according to claim 11 having the formula
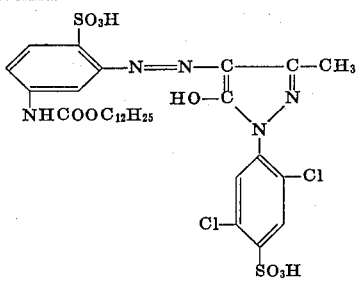
16. A compound according to claim 11 having the formula
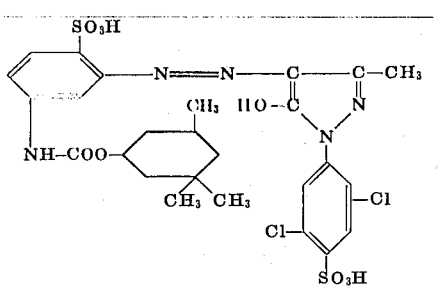
17. A compound according to claim 11 having the formula
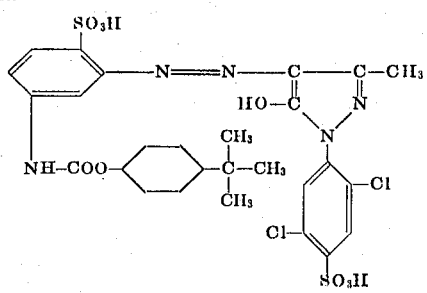
18. A compound according to claim 11 having the formula
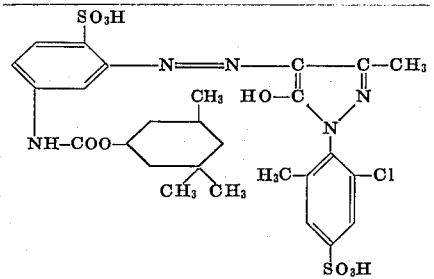
19. A compound according to claim 11 having the formula
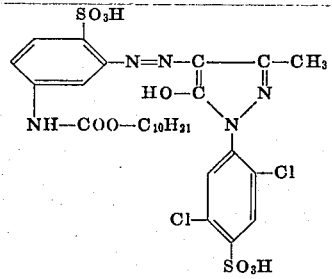
* * * * *